UNITED STATES PATENT OFFICE.

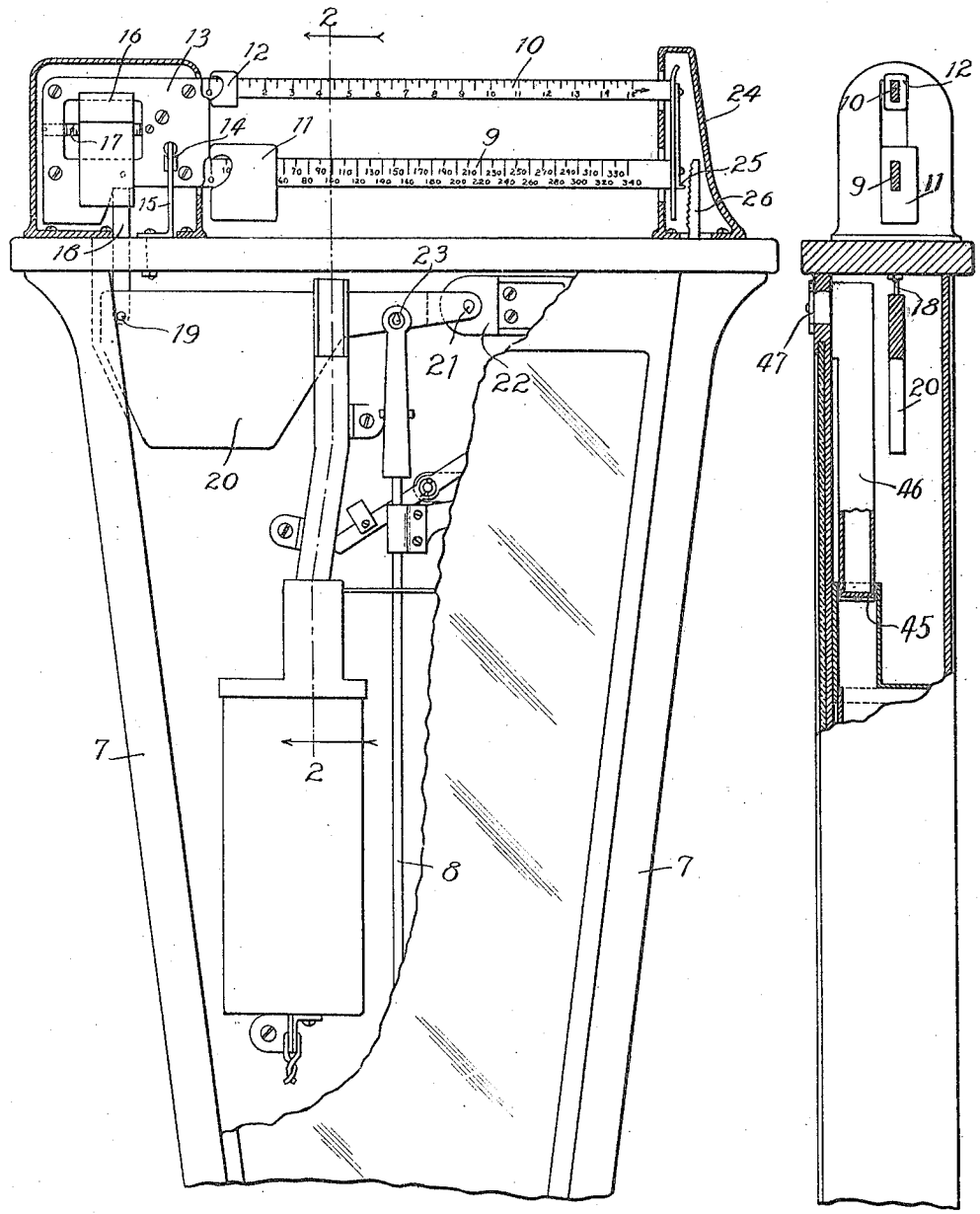

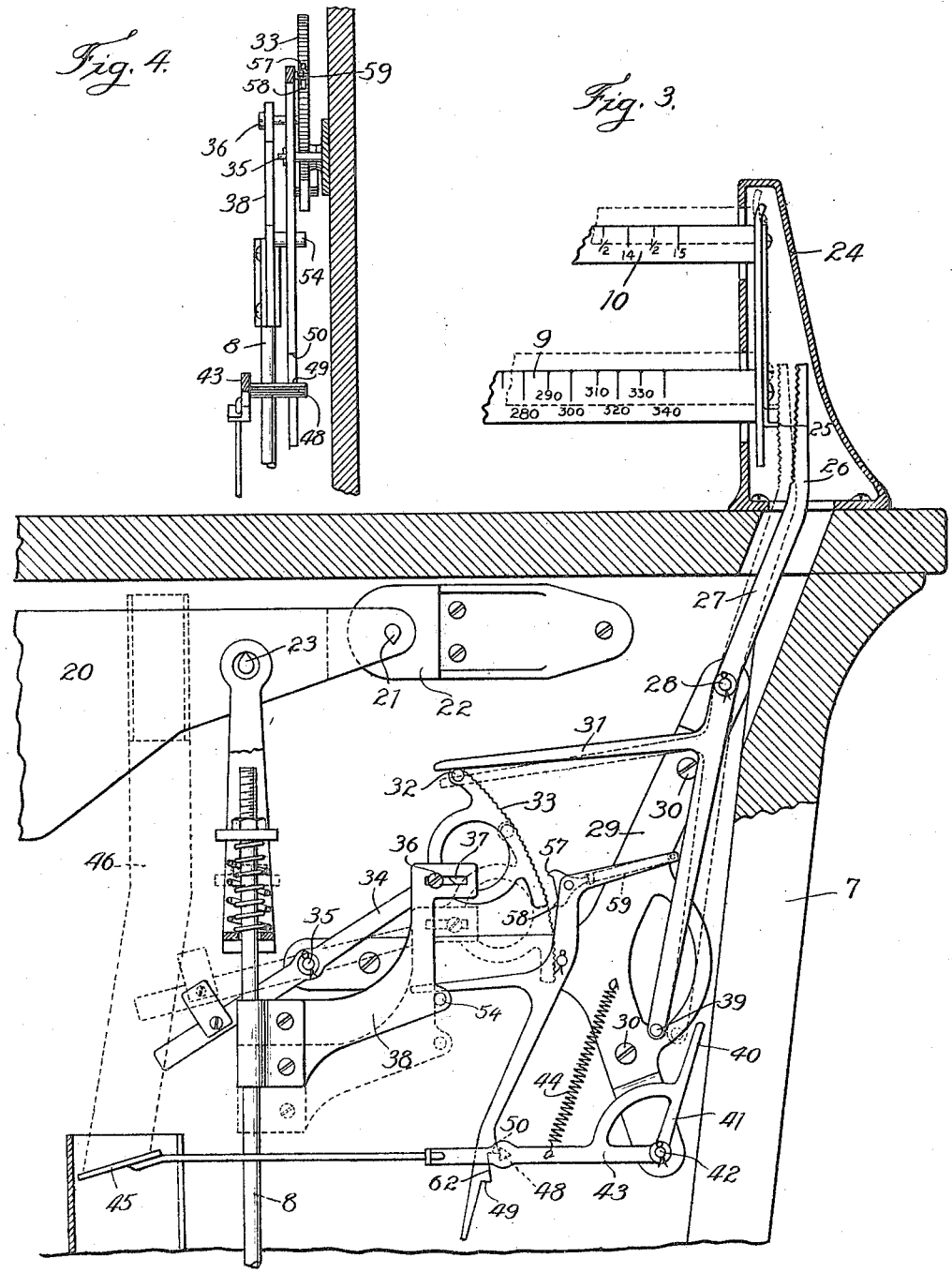

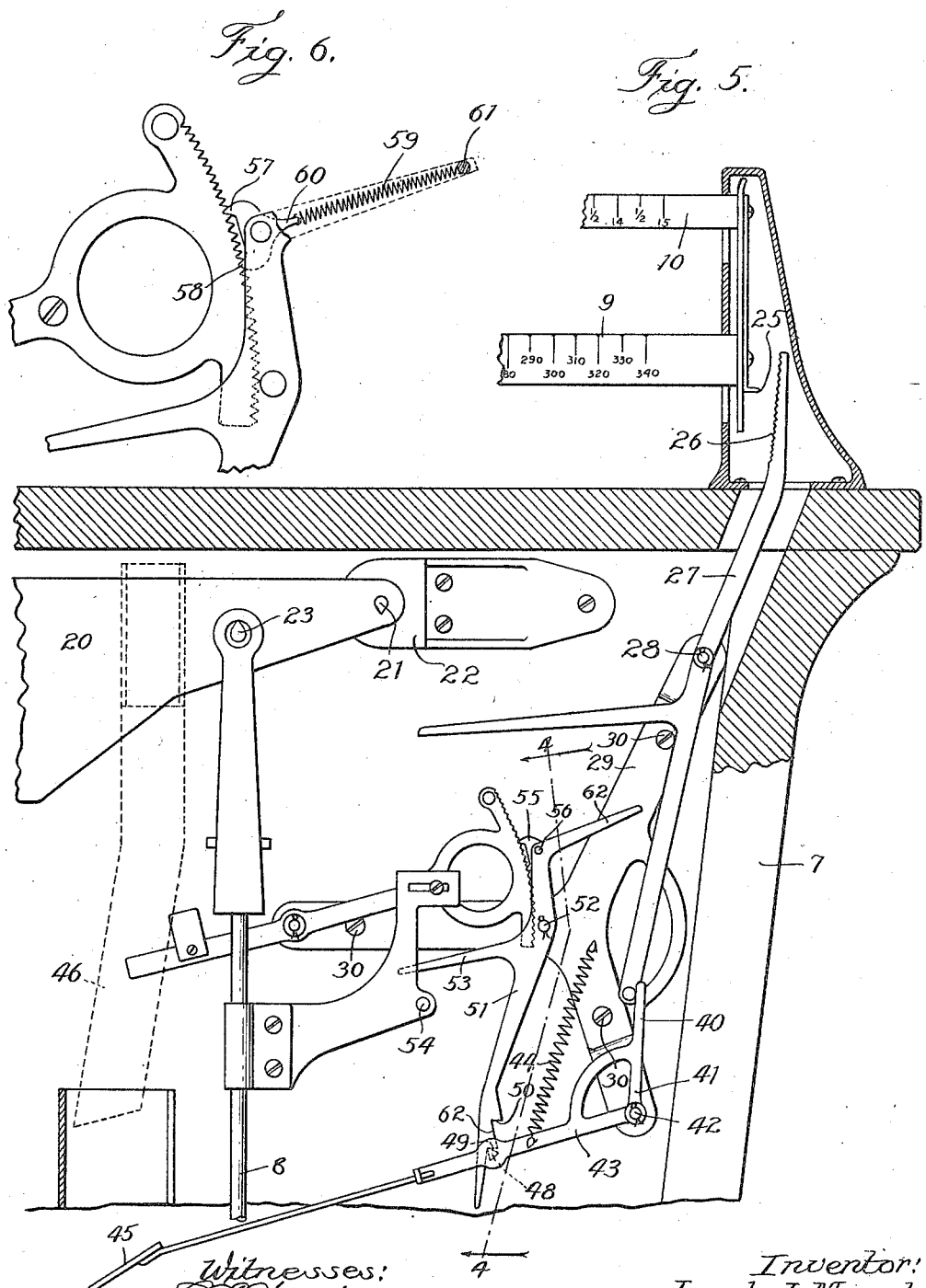

JOSEPH J. MANCEL, OF CHICAGO, ILLINOIS, ASSIGNOR TO MILLS NOVELTY COMPANY, OF CHICAGO, ILLINOIS, A CORPORATION OF ILLINOIS.

WEIGHING-SCALE.

1,257,623.   Specification of Letters Patent.   Patented Feb. 26, 1918.

Application filed December 7, 1917. Serial No. 206,039.

*To all whom it may concern:*

Be it known that I, JOSEPH J. MANCEL, a citizen of the United States, residing at Chicago, in the county of Cook and State of Illinois, have invented a new and useful Improvement in Weighing-Scales, of which the following is a specification.

My invention relates more particularly to improvements in weighing-scales of the coin-controlled type; and my objects generally stated are to provide a novel, simple and improved construction of this type of scale, to the end that the weighing mechanism cannot be operated to accurately designate the weight imposed on the scale-platform, until a coin of the proper denomination, or other token, has been deposited in the machine; and to the end that the mechanism will operate positively and will prevent more than one person from ascertaining his weight upon the insertion of a single coin into the machine.

Referring to the accompanying drawings, Figure 1 is a view in front elevation of a weighing scale constructed in accordance with my invention, certain portions thereof being shown in section and other parts broken away the better to disclose details, the machine being illustrated in normal condition; Fig. 2 is a section taken at the irregular line 2—2 on Fig. 1 and viewed in the direction of the arrows; Fig. 3 is an enlarged view like Fig. 1, with certain parts broken away to disclose details, the mechanism being shown by full lines in normal position and by dotted lines in the position it assumes when weight is applied to the platform of the scale; Fig. 4 is a broken view taken at the irregular line 4—4 on Fig. 5 and viewed in the direction of the arrows; Fig. 5 is a view like Fig. 3, showing the positions assumed by the parts following the placing of a weight on the platform of the scale and the operation of the coin-controlled mechanism by the introduction of a coin into the machine; and Fig. 6, a view in elevation of a detail of the mechanism shown in Fig. 5.

The general features of the illustrated scale mechanism, which is of the beam type, are in accord with common practice, and a general description thereof will therefore be sufficient. The upper portion of the upright section of the scale casing is represented at 7, the lower portion of this section, according to common practice, rising from a base on which the weighing platform (not shown) is supported. The section 7 is hollow and has extending upwardly therethrough the rod 8 which would be so connected with the weighing platform, in accordance with common practice, as to be pulled downwardly when weight is imposed on the weighing platform. The beam mechanism of the scale is located on the top of the section 7 and in the construction illustrated involves a main scale-beam 9 and an auxiliary scale-beam 10 carrying the slidable weights 11 and 12, respectively, and rigidly connected together by a frame 13 pivotally supported at 14 on a bearing member 15 secured to the top of the casing 7, the frame 13 carrying a balancing-weight 16 mounted on a screw 17 extending lengthwise of the frame 13 and engaging the weight 16 and through the medium of which the weight 16 may be shifted lengthwise of the beam mechanism; a link 18 pivotally connected at its upper end with the frame 13 and at its lower end, as indicated at 19, with a lever 20, which is pivotally connected at 21 with a bracket 22 on the section 7, the upper end of the bar 8 being suspended from the lever 20 at the pivotal connection 23.

It will be understood from the foregoing description that the lowering of the rod 8, as by a load placed on the weighing platform, operates through the medium of the lever 20 and link 18 to rock the beam mechanism above described in anti-clockwise direction in opposition to the action of the sliding weights 11 and 12.

In accordance with my invention provision is made for preventing the weighing mechanism from operating in the manner in which it should to indicate the true weight of the object imposed on the weighing platform, unless a coin of the proper denomination, or other suitable token, has been deposited in the machine. In the preferred illustrated embodiment of my invention this is accomplished by providing means which exert a restraint against the operation of the weighing levers, rendering them inoperative for accurate weighing, unless the proper coin or other token has been inserted in the machine.

In accordance with the preferred embodiment of my invention, I provide on the outer end of the beam 9, which, with the beam 10 operates in slots in the wall of a housing 24 on the top of the section 7, a tooth represented at 25, provided for coöperation with the upper serrated portion 26 of the lever 27, which extends upwardly through the top of the section 7 into the housing 24 and is pivoted on a stud 28 extending laterally from a bracket 29 rigidly secured to the inner surface of the rear wall of the section 7, as by screws 30. The lever 27 is provided with a laterally extending arm 31 which coöperates with a pin 32 provided at the upper end of the serrated segmental portion 33 of a lever 34 pivoted on a stud 35 carried by the bracket 29. The lever 34 is provided intermediate its pivot 35 and its serrated portion 33, with a stud 36 which extends through a substantially horizontally disposed slot 37 in an arm 38 rigidly connected with, and laterally extending from, the rod 8, for a purpose hereinafter explained. The lever 27 is provided at its lower end, below the pivot 28, with a stud 39 coöperating with the upper arm 40 of a bell-crank lever 41 pivoted on a stud 42 on the bracket 29. The other arm 43 of this lever, which is connected with one end of a spring 44 carried by the bracket 29 and tending to swing this lever 43 in clockwise direction in Figs. 3 and 5, is equipped with a plate-section 45 which, in the normal position of the mechanism extends across and closes, the lower end of the coin-chute 46, which is in communication at its upper end with a slot 47 in the front of the casing 7, the spring 44 tending to normally hold this lever in the chute-closing position. Projecting laterally from the arm 43 of the lever 41 is a pin 48, preferably of the cross-sectional shape shown in Fig. 5, this pin coöperating with the shoulder portions 49 and 50 on the lower end of a lever 51 pivoted on a stud 52 projecting laterally from the bracket 29. This lever is provided with a section 53 which extends into the path of movement of a pin 54 on the member 38 for a purpose hereinafter described, and at the upper end of this lever is a pawl device 55 pivoted on the upper end of the lever 51, as indicated at 56, this pawl device being provided with a pair of teeth 57 and 58 spaced apart and adapted to engage the serrated portion 33 of the lever 34. The pawl device 55 is adapted to rock in either direction on its pivot 56, but is normally held centrally disposed relative to the serrations 33, by a coil-spring 59 connected at one end with the tail-piece 60 of the pawl device and at its opposite end to the stud 61 projecting laterally from an extension 62 on the lever 51.

In the normal position of the scale its parts occupy the positions illustrated in Fig. 1, and as shown by the full lines in Fig. 3, in which position of the machine the engagement of the pin 32 with the arm 31 of the lever 27 holds the latter, against its tendency to rotate in anti-clockwise direction in Fig. 3, out of engagement at its serrated portion 26 with the tooth 25, and thus the beam mechanism is unrestrained and indicates to those observing it that it is in balance, if the weights 11 and 12 are moved to zero position.

When weight is placed on the scale-platform the rod 8 lowers, thus lowering the bracket 38, which swings the lever 34 in clockwise direction, as for example, to the position represented by dotted lines in Fig. 3, this lever being preferably as delicately balanced on the pivot 35 as practicable to avoid resistance to the lowering of the rod 8 or augment its lowering action. The turning of the lever 34, as stated, also lowers the pin 32 with the result that the lever 27 turns on its pivot 28 in anti-clockwise direction, thus causing its serrated surface 26 to engage the tooth 25 on the beam mechanism, with the result of placing such stress upon this beam mechanism as to interfere with the accurate indication thereby of the weight placed on the platform.

Upon depositing the proper coin into the chute 46, as for example, a penny, the weight thereof exerted against the lever 41 causes it to turn in anti-clockwise direction in Fig. 3 to the position illustrated in Fig. 5 against the resistance of the spring 44, with the result, by reason of the engagement of the arm 40 of the lever 41 with the pin 39, of turning the lever 27 in clockwise direction in Fig. 3 to the position illustrated in Fig. 5, in which it does not interfere with the rocking of the beam mechanism, the movement of the lever 43, under the action of the coin, as stated, permitting the lever 51 to rotate in anti-clockwise direction in Fig. 5 to the position therein shown, in which the pawl 55 engages at both of its teeth with the serrations 33, the lever 43 being locked in the position therein shown, in which position the coin is disengaged therefrom, by engagement of the pin 48 with the shoulder 49.

When the weight is removed from the scale platform the rod 8 rises and swings the lever 34 in anti-clockwise direction to the full line position represented in Fig. 3. At the beginning of the movement of this lever to return position, the engagement of the serrations 33 with the tooth 58 causes the pawl device 55 to rock on its pivot, with the result of turning the lever 51 on its fulcrum 52 in clockwise direction, which disengages the shoulder 49 from the pin 48, thus permitting the lever 43 to swing upwardly and extend at its pin 48 in the space between the shoulders 49 and 50, this movement of the lever 43 shifting its arm 40 sufficiently far to cause the lever 27 to swing to a position in which it engages at its serrations 26 with the tooth 25. In the final movement of the lever 34 to normal position the pin 32 strikes the portion 31 of the lever 27 and swings the latter to a position in which it is out of engagement with the tooth 25, and during such return movement the pin 54 engages the arm 53 of the lever 51, swinging the latter to a position in which its shoulder 50 clears the pin 48, whereupon this pin extends opposite the edge of the lever 51 above the shoulder 50, in which position the pawl device 55 is entirely clear of the serrations 33, it being understood that the lever 51 is held in this position against its tendency to rotate in anti-clockwise direction in the drawings, by engagement with the pin 48, as shown in Fig. 3, thus holding the pawl device 55 entirely free of the serrations 33 during the downward movement of the rod 8 under the action of the weight on the scale platform.

The employment of the shoulder 50 with the recessed portion presenting the surface 62 between the shoulders 49 and 50, is desirable where the machine is to be operated by a relatively light coin, such as a penny, which, as is well understood, exerts relatively slight force. Under such conditions the spring 44 must be relatively light and relatively light resistance, if any, must be presented by the engagement of the pin 48 with the lower end of the lever 51 upon the disengagement of the pin 48 with the shoulder 49, as hereinbefore explained. This condition results in so constructing the lever 51 that when the pin 48 is disengaged from the shoulder 49 as stated, the pawl device 55 may slightly engage the serrations 33, but such engagement is positively prevented, in order that the lever 34 may swing downwardly upon the application of weight to the platform without obstruction from the pawl device 55, by the resting of the lever 51 at the surface thereof immediately above the shoulder 50, against the pin 48, as shown in Fig. 3. It will be understood, however, that where the weight of the coin is such that the spring 44 may be made stiffer, the provision of the recess 62 is rendered unnecessary.

In the particular construction illustrated provision is made for preventing the separate weighing of two persons by the insertion of a single coin into the machine or, in other words, the weighing of one person and the sliding of the weight of such person from the scale and the simultaneous application of the weight of the other person to the scale, provided the variation of weight of the two persons is a few pounds or more, or the weight at any time on the scale varies more than a few pounds. Such weighing is prevented as follows. If the weight on the scale after the insertion of a coin therein and the operation of the coin-controlled mechanism to the position shown in Fig. 5 is increased, as by adding more weight to the scale, the further turning of the lever 34 in clockwise direction in Fig. 5 operates by engagement of the serrations 33 with the tooth 57 to rotate the pawl device 55 on the lever 51, thereby disengaging the shoulder 49 from the lug 48 and permitting the lever 43 to return to a position in which the lever 27 engages the tooth 25 and interferes with the proper weighing of the scale.

Should the weight on the scale be lessened, the lever 34 will rotate in anti-clockwise direction and by engagement of its serrations 33 with the tooth 58 will rock the lever 51 and cause the lever 27 to swing to a position in which it interferes with the balancing of the scale, as hereinbefore described.

While I have illustrated and described a particular construction in which my invention is embodied I do not wish to be understood as intending to limit it thereto, as the same may be variously modified and altered without departing from the spirit of my invention.

What I claim as new and desire to secure by Letters Patent is—

1. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, means on said fourth member adapted to engage said second member when said fourth member is in position for holding said third member against return movement, and operating in the movement of said second member in either direction after the actuation of said third member by a coin, to release said third member from said fourth member and permit the latter to move to a position in which said first-named member interferes with the weighing operation, and means operating to hold the said means on said fourth member out of engagement with said second member during the movement of said second member when weight is applied to the scale previous to the engagement of a coin with said third member.

2. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, means on said fourth member adapted to engage said second member when said fourth member is in position for holding said third member against return movement, and operating in the movement of said second member in either direction after the actuation of said third member by a coin, to release said third member from said fourth member and permit the latter to move to a position in which said first-named member interferes with the weighing operation, and means on said third member for holding the said means on said fourth member out of engagement with said second member during the movement of said second member when weight is applied to the scale previous to the engagement of a coin with said third member.

3. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a rock member adapted to engage said third member when the latter is actuated by a coin and hold said third member against return to normal position, means on said rock member adapted to engage said second member when said rock member is in position for holding said third member against return movement and operating in the movement of said second member in either direction after the actuation of said third member by a coin, to release said third member from said rock member and permit the latter to move to a position in which said first-named member interferes with the weighing operation, and means operating to hold the said means on said rock member out of engagement with said second member during the movement of said second member when weight is applied to the scale previous to the engagement of a coin with said third member.

4. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, a detent device on said fourth member adapted to engage said second member when said fourth member is in a position for holding said third member against return movement and operating in the movement of said second member in either direction after the actuation of said third member by a coin, to release said third member from said fourth member and permit the latter to move to a position in which said first-named member interferes with the weighing operation, and means operating to hold said detent device out of engagement with said second member during the movement of said second member when weight is applied to the scale previous to the engagement of a coin with said third member.

5. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, a detent device on said fourth member formed of a pivoted member having teeth spaced apart and a spring tending to hold said pivoted member in a centralized position, said detent member being adapted to engage at its teeth with said second member when said fourth member is in position for holding said third member against return movement, said detent device being so constructed and arranged that it will shift said fourth member to a position in which the latter is released from said third member, permitting the latter to move to a position in which said first-named member interferes with the weighing operation, upon the movement of said second member in either direction after the actuation of said third member by a coin, and means operating to hold the said detent device out of engagement with said second member during the movement of said second member when weight is applied to the scale previous to the engagement of a coin with said third member.

6. In a weighing scale, the combination with weighing mechanism, of a member movable into and out of position for preventing the scale from weighing, a second member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, means on said fourth member adapted to engage said second member when said fourth member is in position for holding said third member against return movement, and operating in the movement of said second member in either direction after the actuation of said third member by a coin, to release said third member from said fourth member and permit the latter to move to a position in which said first-named member interferes with the weighing operation, means operated by said second member upon its movement to normal position after weighing, for moving said fourth member in a direction for carrying the said means thereon away from said first-named member, and means operating to hold the said fourth member in a position in which said last-referred-to means will be out of engagement with said second member during the movement of said second member when weight is applied to the scale previous to the engagement of a coin with said third member.

7. In a weighing scale, the combination with weighing mechanism, of a member movable into and out of position for preventing the scale from weighing, a second member formed of a substantially balanced rock member mounted to be movable and movable upon the imposition of a weight upon the scale, said first-named member when weight is applied to the scale extending into position for preventing the scale from weighing, a third, coin-controlled member adapted to be operated by the engagement therewith of a coin and when so operated causing said first-named member to shift to a position in which it does not interfere with the weighing operation, a fourth member adapted to engage said third member when the latter is actuated by a coin and hold said third member against return to normal position, means on said fourth member adapted to engage said second member when said fourth member is in position for holding said third member against return movement, and operating in the movement of said second member in either direction after the actuation of said third member by a coin, to release said third member from said fourth member and permit the latter to move to a position in which said first-named member interferes with the weighing operation, and means operating to hold the said means on said fourth member out of engagement with said second member during the movement of said second member when weight is applied to the scale previous to the engagement of a coin with said third member.

8. In a weighing scale, the combination with weighing mechanism, of a pivotally supported member movable at one end into and out of position for preventing the scale from weighing, said member having a lateral extension, a second member formed of a pivotally supported bar having a serrated surface, said second member being movable upon the imposition of a weight upon the scale, said first-named member when weight is applied to the scale extending into position for preventing the scale from weighing, a third, coin-controlled pivotally supported member adapted to be rocked on its pivot by the engagement therewith at one end of a coin and coöperating at its opposite end with said first-named member and operating, when operated by a coin, to cause said first-named member to rock to a position in which it does not interfere with the weighing operation, a fourth, pivotally supported member adapted to engage said third member when the latter is actuated by a coin and hold said third member against return to normal position, said fourth member having a laterally extending projection, a detent device on said fourth member adapted to engage the serrations of said second member when said fourth member is in position for holding said third member against return movement, said means being so constructed and arranged as to cause said fourth member to be moved to a position in which said third member is released therefrom, to permit the latter to move to a position in which said first-named member interferes with the weighing operation, upon the movement of said second member in either direction after the actuation of said third member by a coin, a spring for returning said third member to normal position, and means operating to hold the detent on said fourth member out of engagement with said second member during the movement of said second member when weight is applied to the scale previous to the engagement of a coin with said third member, said second member operating upon its return to normal position after the weighing operation, to engage the extensions on said first-named member and said fourth member, respectively, to cause said first member to be in a position in which it will not interfere with the balancing of the scale and to rock said fourth member for moving said detent device in a direction away from the serrations on said second member.

JOSEPH J. MANCEL.

Copies of this patent may be obtained for five cents each, by addressing the "Commissioner of Patents Washington, D. C."